United States Patent
Chen et al.

(10) Patent No.: US 9,860,914 B2
(45) Date of Patent: Jan. 2, 2018

(54) HANDLING FDD AND TDD TIMING OFFSET IN FDD AND TDD CA IN LTE

(71) Applicant: QUALCOMM Incorporated, San Diego, CA (US)

(72) Inventors: Wanshi Chen, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/608,433

(22) Filed: Jan. 29, 2015

(65) Prior Publication Data
US 2015/0230268 A1    Aug. 13, 2015

Related U.S. Application Data

(60) Provisional application No. 61/937,987, filed on Feb. 10, 2014.

(51) Int. Cl.
| | |
|---|---|
| *H04W 72/14* | (2009.01) |
| *H04L 5/14* | (2006.01) |
| *H04L 5/00* | (2006.01) |
| *H04W 56/00* | (2009.01) |
| *H04W 72/12* | (2009.01) |

(52) U.S. Cl.
CPC ............. *H04W 72/14* (2013.01); *H04L 5/001* (2013.01); *H04L 5/0053* (2013.01); *H04L 5/14* (2013.01); *H04W 56/0005* (2013.01); *H04W 56/0045* (2013.01); *H04L 5/143* (2013.01); *H04W 72/1268* (2013.01)

(58) Field of Classification Search
CPC ............. H04W 72/14; H04W 56/0005; H04W 56/0045; H04W 72/1268; H04L 5/14; H04L 5/001; H04L 5/0053; H04L 5/143
See application file for complete search history.

(56) References Cited

U.S. PATENT DOCUMENTS

| | | | |
|---|---|---|---|
| 8,848,674 B2* | 9/2014 | Kwon | H04W 56/0005 370/336 |
| 8,848,687 B2* | 9/2014 | Kwon | H04W 56/0005 370/350 |
| 9,025,476 B2* | 5/2015 | Weng | H04W 48/20 370/252 |
| 9,094,849 B2* | 7/2015 | Falconetti | H04L 5/001 |

(Continued)

OTHER PUBLICATIONS

International Search Report and Written Opinion—PCT/US2015/013669—ISA/EPO—dated Apr. 7, 2015.

(Continued)

*Primary Examiner* — Phuc Tran
(74) *Attorney, Agent, or Firm* — Patterson & Sheridan L.L.P.

(57) ABSTRACT

Aspects of the present disclosure relate to techniques for determining timing of uplink transmissions for UEs communicating with carrier aggregation involving both frequency division duplexing (FDD) and time division duplexing (TDD) component carriers (CCs). A timing advance (TA) offset value for a user equipment (UE) to use for uplink transmissions is determined based, at least in part, on which of the CCs carries a physical uplink control channel (PUCCH).

26 Claims, 12 Drawing Sheets

UL timing offset based on PCell system type

(56) References Cited

U.S. PATENT DOCUMENTS

| | | | |
|---|---|---|---|
| 9,144,033 B2* | 9/2015 | Speight | H04W 74/0833 |
| 2012/0039239 A1* | 2/2012 | Park | H04B 7/155 |
| | | | 370/315 |
| 2013/0201911 A1* | 8/2013 | Bergstrom | H04W 56/0045 |
| | | | 370/328 |
| 2015/0189610 A1* | 7/2015 | Siomina | G01S 5/021 |
| | | | 370/280 |
| 2015/0230268 A1* | 8/2015 | Chen | H04L 5/14 |
| | | | 370/280 |
| 2015/0341918 A1* | 11/2015 | Yang | H04L 5/00 |
| | | | 370/312 |
| 2016/0219547 A1* | 7/2016 | Seo | H04W 56/0045 |

OTHER PUBLICATIONS

MEDIATEK Inc: "PUCCH transmission on Scell for TDD-FDD CA", 3GPP Draft; R1-135429 PUCCH Transmission on SCELL for TDD-FDD CA, 3rd Generation Partnership Project (3GPP), Mobile Competence Centre; 650, Route Des Lucioles; F-06921 Sophia-Antipolis Cedex; Franc, vol. RAN WG1, No. San Francisco, US; Nov. 11-Nov. 15, 2013 Nov. 13, 2013 (Nov. 13, 2013), pp. 1-2, XP050735104, Retrieved from the Internet: URL:http://www.3gpp.org/ftp/Meetings_3GPP_SYNC/RAN/RAN1/Docs/ [retrieved on Nov. 13, 2013].

MEDIATEK Inc: "TDM UL transmission for TDD-FDD DL CA capable UE with single transmitter", 3GPP Draft; R1-135430 TDM UL Transmission for TDD-FDD DL CA Capable UE With Single Transm Iiier, 3rd Generation Partnership Project (3GPP), Mobile Competence Centre; 650, Route Des Lucioles; F-06921, vol. RAN WG1, No. San Francisco, US; Nov. 11-Nov. 15, 2013 Nov. 13, 2013 (Nov. 13, 2013), pp. 1-2, XP050735105, Retrieved from the Internet: URL:http://www.3gpp.org/ftp/Meetings_3GPP_SYNC/RAN/RAN1/Docs/ [retrieved on Nov. 13, 2013].

MEDIATEK Inc: "TDM UL transmission for TDD-FDD DL CA-capable UE with single transmitter",3GPP Draft; R1-140236 TDM UL Transmission for TDD-FDD DL CA Capable UE With Single Transmitter, 3rd Generation Partnership Project (3GPP), Mobile Competence Centre; 650, Route Des Lucioles; F-06921, vol. RAN WG1, no. Prague, CX; Feb. 10-Feb. 14, 2011, Feb. 1, 2014 (Feb. 1, 2014), pp. 1-2, XP050751885, Retrieved from the Internet: URL:http://www.3gpp.org/ftp/tsg_ran/WG_RL1/TSGR1_76/Docs/ [retrieved on Feb. 1, 2014].

NTT DOCOMO: "Design of HARQ feedback for TDD-FDD CA", 3GPP Draft; R1-140618, 3rd Generation Partnership Project (3GPP), Mobile Competence Centre ; 650, Route Des Lucioles; F-06921 Sophia-Antipolis Cedex; France, vol. RAN WG1, no. Prague, Czech Republic; Feb. 10-Feb. 14, 2014, Feb. 9, 2014 (Feb. 9, 2014), pp. 1-3, XP050736143, Retrieved from the Internet: URL:http://www.3gpp.org/ftp/Meetings_3GPP_SYNC/RAN/RAN1/Docs/ [retrieved on Feb. 9, 2014].

Samsung: "Multiple TA for TDD-FDD CA", 3GPP Draft; R1-140365, 3rd Generation Partnership Project (3GPP), Mobile Competence Centre; 650, Route Des Lucioles; F-06921 Sophia-Antipolis Cedex; France, vol. RAN WG1, no. Prague, Czech Republic; Feb. 10-Feb. 14, 2014 Feb. 9, 2014 (Feb. 9, 2014), p. 1, XP050735912, Retrieved from the Internet: URL:http://www.3gpp.org/ftp/Meetings_3GPP_SYNC/RAN/RAN1/Docs/ [retrieved on Feb. 9, 2014].

* cited by examiner

HANDLING FDD AND TDD TIMING OFFSET IN FDD AND TDD CA IN LTE

CROSS-REFERENCE TO RELATED APPLICATIONS

This application claims benefit of U.S. Provisional Patent Application Ser. No. 61/937,987, filed Feb. 10, 2014, which is expressly herein incorporated by reference.

FIELD

Certain embodiments of the present disclosure generally relate to wireless communication and, more particularly, to techniques for handling frequency division duplexing (FDD) and time division duplexing (TDD) timing offset in FDD and TDD carrier aggregation (CA) in LTE.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a relay base station that relays messages between a donor base station and wireless terminals. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link.

SUMMARY

Aspects of the present disclosure relate to techniques for handling frequency division duplexing (FDD) and time division duplexing (TDD) timing offset in FDD and TDD carrier aggregation (CA) in LTE. One example method generally includes communicating using carrier aggregation (CA) involving at least one component carrier (CC) using a time division duplex (TDD) system configuration and at least one CC using a frequency division duplex (FDD) system configuration; and determining a timing advance (TA) offset value for a user equipment (UE) to use for uplink transmissions based, at least in part, on which of the CCs carries a physical uplink control channel (PUCCH).

Aspects of the present disclosure provide an apparatus for wireless communications. The apparatus generally includes at least one processor configured to communicate using carrier aggregation (CA) involving at least one component carrier (CC) using a time division duplex (TDD) system configuration and at least one CC using a frequency division duplex (FDD) system configuration and determine a timing advance (TA) offset value for a user equipment (UE) to use for uplink transmissions based, at least in part, on which of the CCs carries a physical uplink control channel (PUCCH). The apparatus also generally includes a memory coupled with the at least one processor.

Aspects of the present disclosure provide an apparatus for wireless communications. The apparatus generally includes means for communicating using carrier aggregation (CA) involving at least one component carrier (CC) using a time division duplex (TDD) system configuration and at least one CC using a frequency division duplex (FDD) system configuration and means for determining a timing advance (TA) offset value for a user equipment (UE) to use for uplink transmissions based, at least in part, on which of the CCs carries a physical uplink control channel (PUCCH).

Aspects of the present disclosure provide non-transitory computer-readable medium for wireless communications. The computer-readable medium generally includes code stored thereon, the code comprising code for communicating using carrier aggregation (CA) involving at least one component carrier (CC) using a time division duplex (TDD) system configuration and at least one CC using a frequency division duplex (FDD) system configuration; and determining a timing advance (TA) offset value for a user equipment (UE) to use for uplink transmissions based, at least in part, on which of the CCs carries a physical uplink control channel (PUCCH).

Certain aspects of the present disclosure provide various apparatuses and program products for performing the operations of the methods described above.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
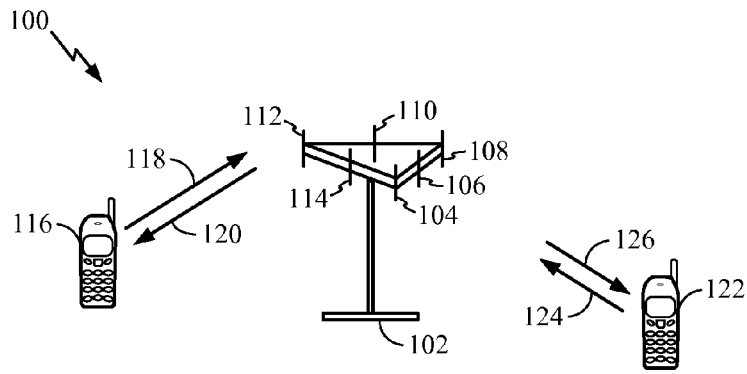
FIG. 1 illustrates a multiple access wireless communication system, according to aspects of the present disclosure.

User equipments (UEs) may be capable of performing wireless communication by aggregating together time division duplexing (TDD) component carriers and frequency division duplexing (FDD) component carriers (CCs), called FDD/TDD carrier aggregation (CA). Transmitting on the uplink in both TDD and FDD CCs present challenges, as different parameters, such as timing advance offsets, may be used by the UE to determine timing of uplink transmissions in TDD and FDD.

Aspects of the present disclosure provide techniques for handling different timing advance (TA) offsets defined for time division duplexing (TDD) and frequency division duplexing (FDD) in LTE TDD/FDD carrier aggregation (CA).

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a wireless transmission technique. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in uplink communications where lower PAPR greatly benefits the mobile terminal in terms of transmit power efficiency. It is currently a working assumption for the uplink multiple access scheme in 3GPP Long Term Evolution (LTE), or Evolved UTRA.

Example Wireless Network

FIG. 1 shows a wireless communication network 100 (e.g., an LTE network), in which aspects of the present disclosure may be performed. For example, UEs 116 and 122 may utilize the techniques described herein to determine timing of uplink transmissions when using TDD and FDD carrier aggregation.

Referring to FIG. 1, a multiple access wireless communication system according to one embodiment is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a frequency division duplexing (FDD) system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 102.

In communication over forward links 120 and 126, the transmitting antennas of access point 102 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a base station, an access point, a Node B, or some other terminology. An access terminal may also be called an access terminal, user equipment (UE), a wireless communication device, terminal, or some other terminology.

Wireless communication network 100 may support operation on multiple carriers, which may be referred to as carrier aggregation (CA) or multi-carrier operation. A carrier may also be referred to as a component carrier (CC), a layer, etc. The terms "carrier," "layer," and "CC" may thus be used interchangeably herein. A carrier used for the downlink may be referred to as a downlink CC, and a carrier used for the uplink may be referred to as an uplink CC. A combination of a downlink CC and an uplink CC may be referred to as a cell. It is also possible to have a cell consisting of a downlink CC. A UE 116 may be configured with multiple downlink CCs and one or more uplink CCs for carrier aggregation. Base station 102 may be configured to support communications with UEs over multiple CCs on the downlink and/or uplink. Thus, a UE 116 may receive data and control information on one or more downlink CCs from one base station 102 or from multiple base stations 102 (e.g., single or multi-layer eNBs). The UE 116 may transmit data and control information on one or more uplink CCs to one or more base stations 102. Carrier aggregation may be used with both FDD and TDD component carriers. For DL carrier aggregation, multiple bits of ACK/NACK are fed back when multiple DL transmissions occur in one subframe.

Figure 2:
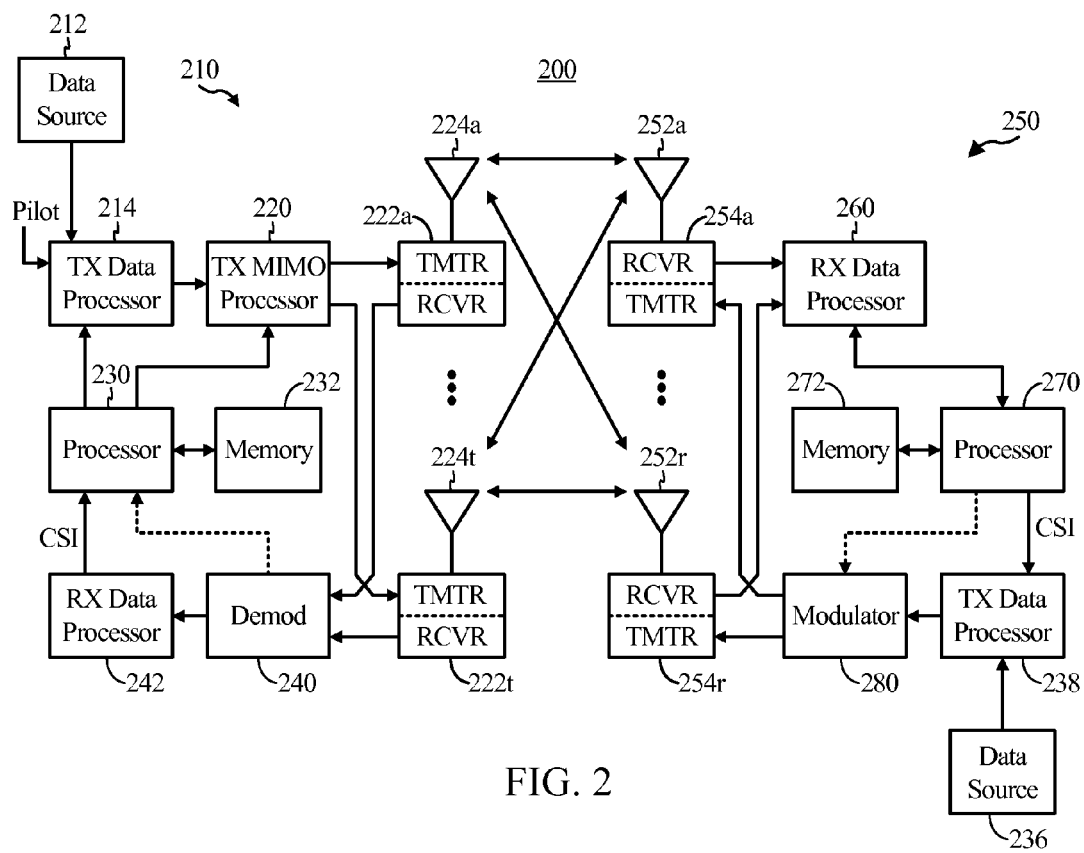
FIG. 2 is a block diagram of a communication system, according to aspects of the present disclosure.

FIG. 2 is a block diagram of an embodiment of a transmitter system 210 (also known as an access point) and a receiver system 250 (also known as an access terminal) in a MIMO system 200. According to certain aspects, the transmitter system 210 and the receiver system 250 may correspond to the base station 110 and/or the user equipment 116/122, respectively, as illustrated in FIG. 1. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), quadrature phase shift keying (QPSK), M phase shift keying (M-PSK), or M quadrature amplitude modulation (M-QAM)) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

A receive (RX) data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights and then processes the extracted message.

According to certain aspects, one or more of the processors (e.g., the TX Data processor 214, the TX MIMO processor 220, the processor 230, and/or the RX Data processor 242) of the transmitter system 210 and/or one or more processor (e.g., the TX Data processor 238, the processor 270, and/or the RX Data processor 260) of the receiver system 250 may be configured to perform operations described herein for determining timing of uplink transmissions when communicating using TDD/FDD aggregation.

In an aspect, logical channels are classified into Control Channels and Traffic Channels. Logical Control Channels comprise Broadcast Control Channel (BCCH), which is a downlink (DL) channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several Multicast Traffic Channels (MTCHs). Generally, after establishing an radio resource control (RRC) connection, this channel is only used by UEs that receive MBMS. Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH). The PCH may be used for support of discontinuous reception (DRX) by UEs. The use of DRX allows power savings by the UE (the DRX cycle is indicated by the network to the UE). The PCH is broadcasted over entire cell and mapped to physical layer (PHY) resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

In an aspect, a channel structure is provided that preserves low PAPR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C—Control—
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U—User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block In addition, Rel-8 refers to Release 8 of the LTE standard.

Figure 3:
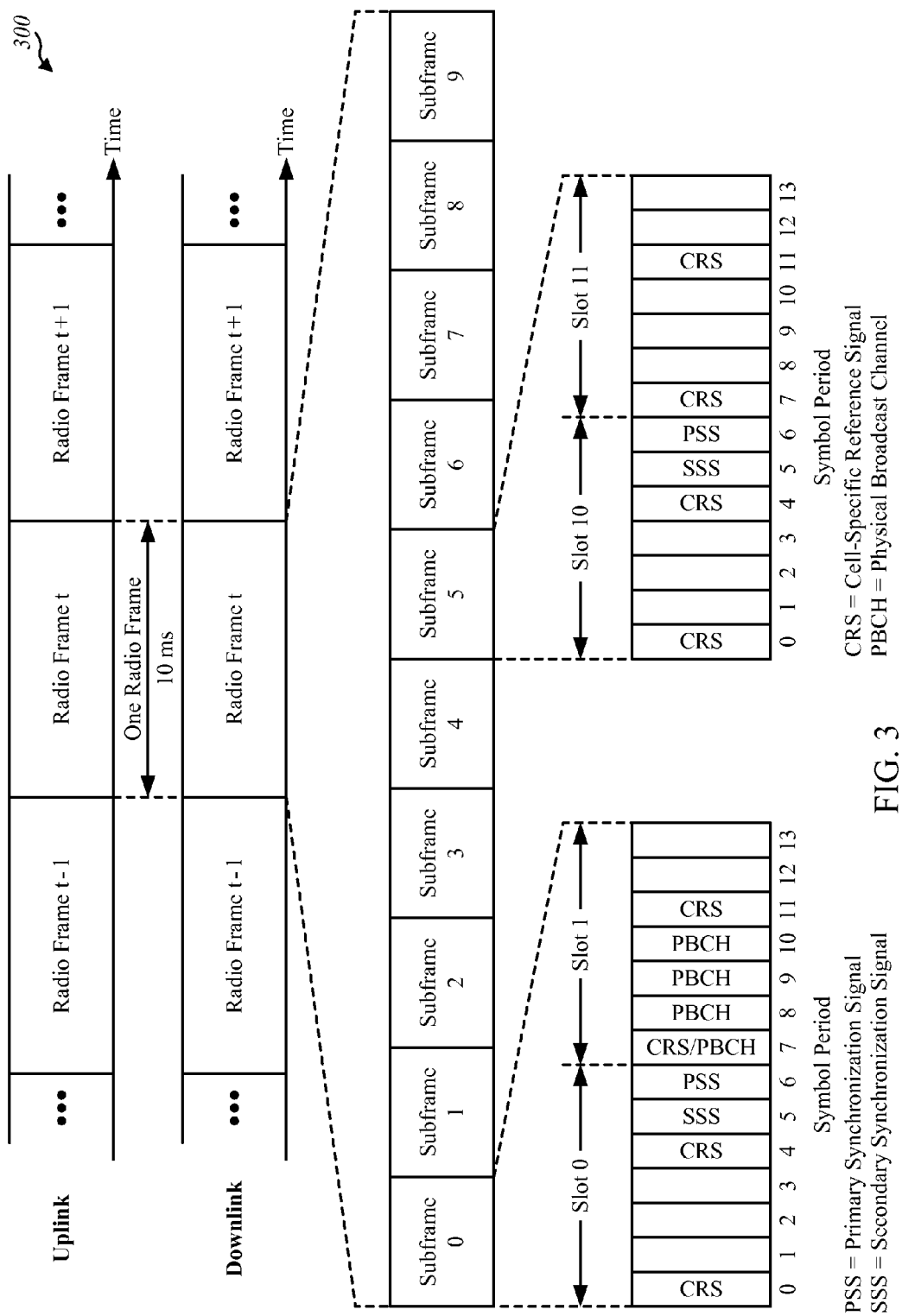
FIG. 3 illustrates an example frame structure, according to aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNodeB may transmit a primary synchronization signal (PSS) and a secondary synchronization signal (SSS) on the downlink in the center 1.08 MHz of the system bandwidth for each cell supported by the eNodeB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. During cell search and acquisition the terminal detects the cell frame timing and the physical-layer identity of the cell from which the terminal learns the start of the reference-signal sequence (given by the frame timing) and the reference-signal sequence of the cell (given by the physical layer cell identity). The eNodeB may transmit a cell-specific reference signal (CRS) across the system bandwidth for each cell supported by the eNodeB. The CRS may be transmitted in certain symbol periods of each subframe and may be used by the UEs to perform channel estimation, channel quality measurement, and/or other functions. The eNodeB may also transmit a Physical Broadcast Channel (PBCH) in symbol periods 0 to 3 in slot 1 of certain radio frames. The PBCH may carry some system information. The eNodeB may transmit other system information such as System Information Blocks (SIBs) on a Physical Downlink Shared Channel (PDSCH) in certain subframes. The eNodeB may transmit control information/data on a Physical Downlink Control Channel (PDCCH) in the first B symbol periods of a subframe, where B may be configurable for each subframe.

The eNodeB may transmit traffic data and/or other data on a PDSCH in the remaining symbol periods of each subframe.

Figure 4:
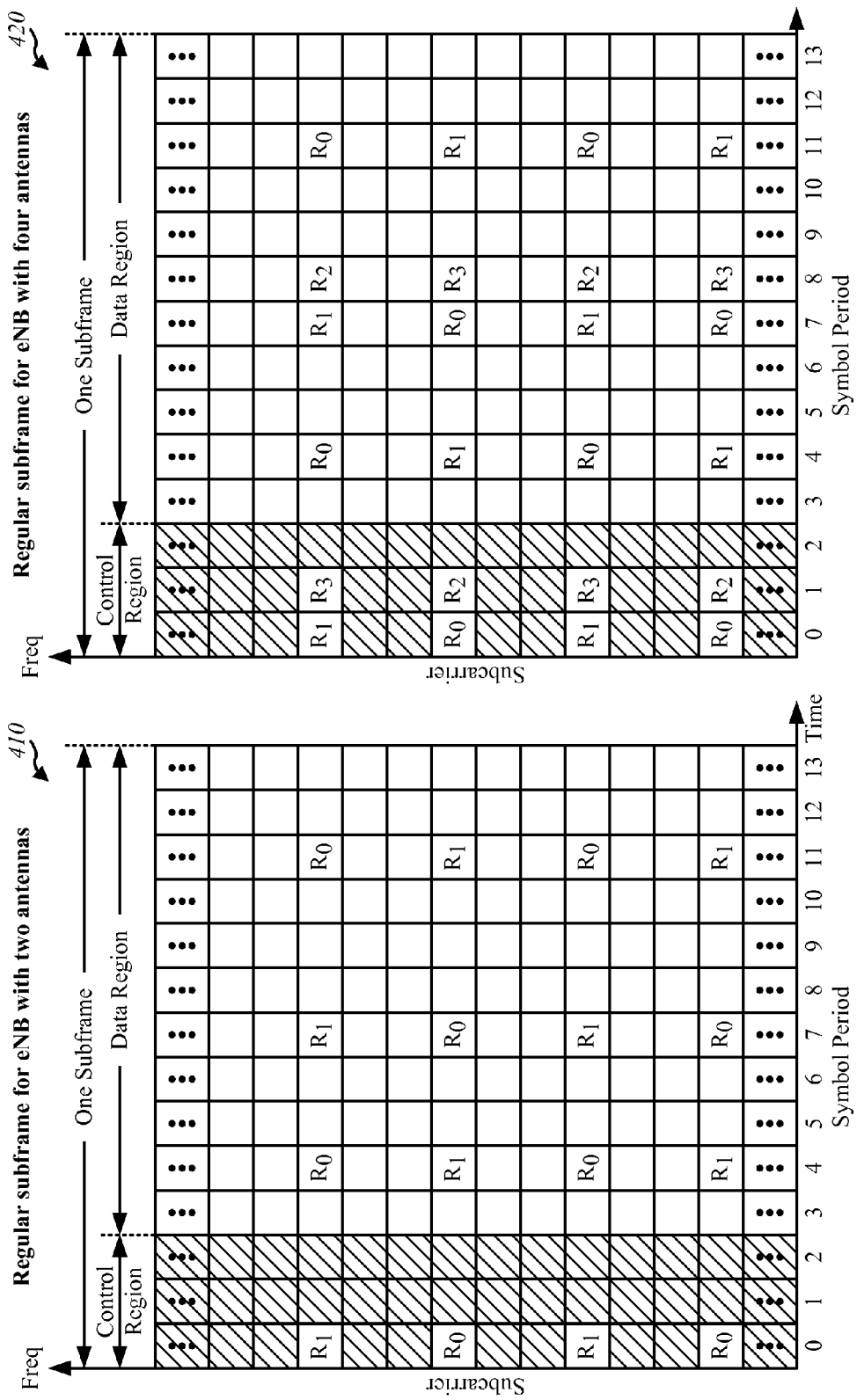
FIG. 4 illustrates an example subframe resource element mapping, according to aspects of the present disclosure.

FIG. 4 shows two exemplary subframe formats 410 and 420 for downlink transmissions from an eNodeB using the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNodeB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label $R_a$, a modulation symbol (e.g., a CRS) may be transmitted on that resource element from antenna a, and no modulation symbols may be transmitted on that resource element from other antennas. Subframe format 420 may be used for an eNodeB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNodeBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS, and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q subframes. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNodeB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNodeBs. One of these eNodeBs may be selected to serve the UE. The serving eNodeB may be selected based on various criteria such as received signal strength, received signal quality, pathloss, etc. Received signal quality may be quantified by a signal-to-noise-and-interference ratio (SINR), a reference signal received quality (RSRQ), or some other metric. The UE may operate in a dominant interference scenario in which the UE may observe high interference from one or more interfering eNodeBs. For example, an eNodeB may restrict access to only a certain group of UEs. The group may be referred to as a closed subscriber group (CSG), and the restricting eNodeB may be referred to as a closed subscriber group eNodeB or cell. If a UE that is not a member of the CSG is near the CSG eNodeB, then the UE will receive signals from the CSG eNodeB at relatively high strength, while being denied access to the CSG eNodeB. The UE will attempt to associate with another eNodeB and receive service from the other eNodeB, while signals from the nearby CSG eNodeB will act as interference to communications between the UE and the serving eNodeB.

Carrier Aggregation

Certain types of devices, such as LTE-Advanced UEs, may use spectrum in bandwidths of up to 20 MHz per component carrier allocated in a carrier aggregation of up to a total of 100 MHz (5 component carriers) for transmission in each direction. For LTE-Advanced mobile systems, two types of carrier aggregation (CA) methods have been proposed, continuous CA and non-continuous CA. Both non-continuous and continuous CA involves aggregating multiple LTE/component carriers to serve a single LTE-Advanced UE.

According to various embodiments, a UE operating in a multicarrier system (also referred to as carrier aggregation) is configured to aggregate certain functions of multiple carriers, such as control and feedback functions, on the same carrier, which may be referred to as a "primary carrier" or "anchor carrier." The remaining carriers that depend on the primary carrier for support are referred to as associated secondary carriers. For example, a UE may aggregate control functions such as those provided by a dedicated channel (DCH), nonscheduled grants, a physical uplink control channel (PUCCH), and/or a physical downlink control channel (PDCCH). CA can improve overall transmission efficiency, in that resources on the primary carrier are used for control functions (as well as data transmissions), while the secondary carriers are available for data transmission. Thus, the ratio of transmitted data to control functions may be increased by CA, when compared to non-CA techniques.

Figure 5:
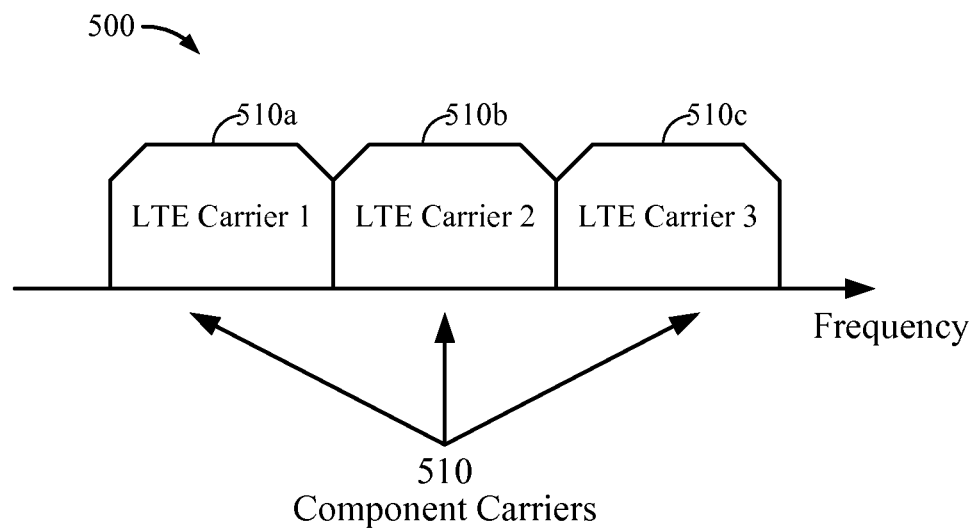
FIG. 5 illustrates continuous carrier aggregation, in accordance with certain aspects of the disclosure.

FIG. 5 illustrates continuous CA 500, in which multiple available component carriers 510 adjacent to each other are aggregated.

Figure 6:
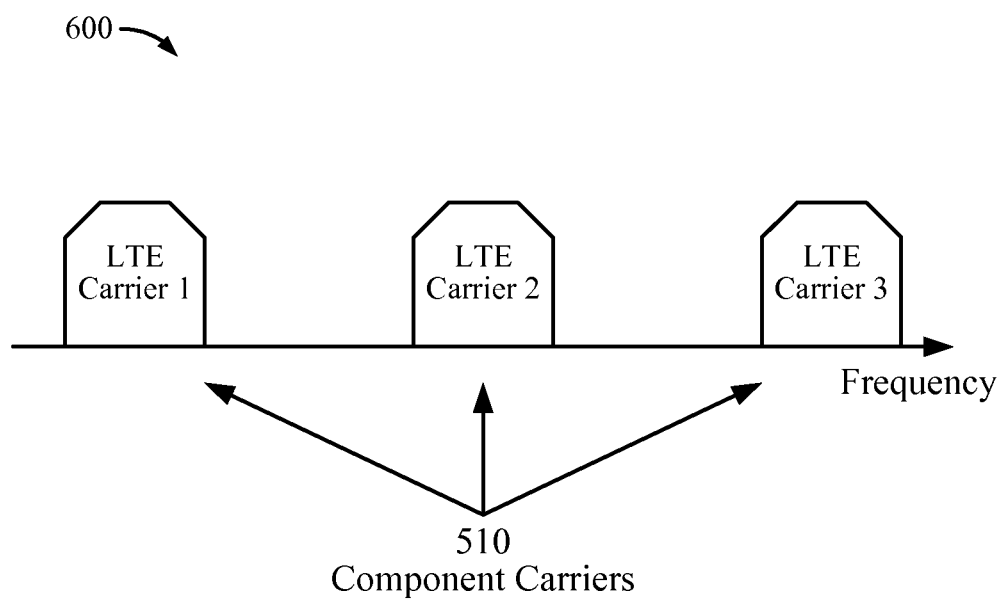
FIG. 6 illustrates non-continuous carrier aggregation, in accordance with certain aspects of the disclosure.

FIG. 6 illustrates non-continuous CA 600, in which multiple available component carriers 510, separated along the frequency band, are aggregated.

Figure 7:
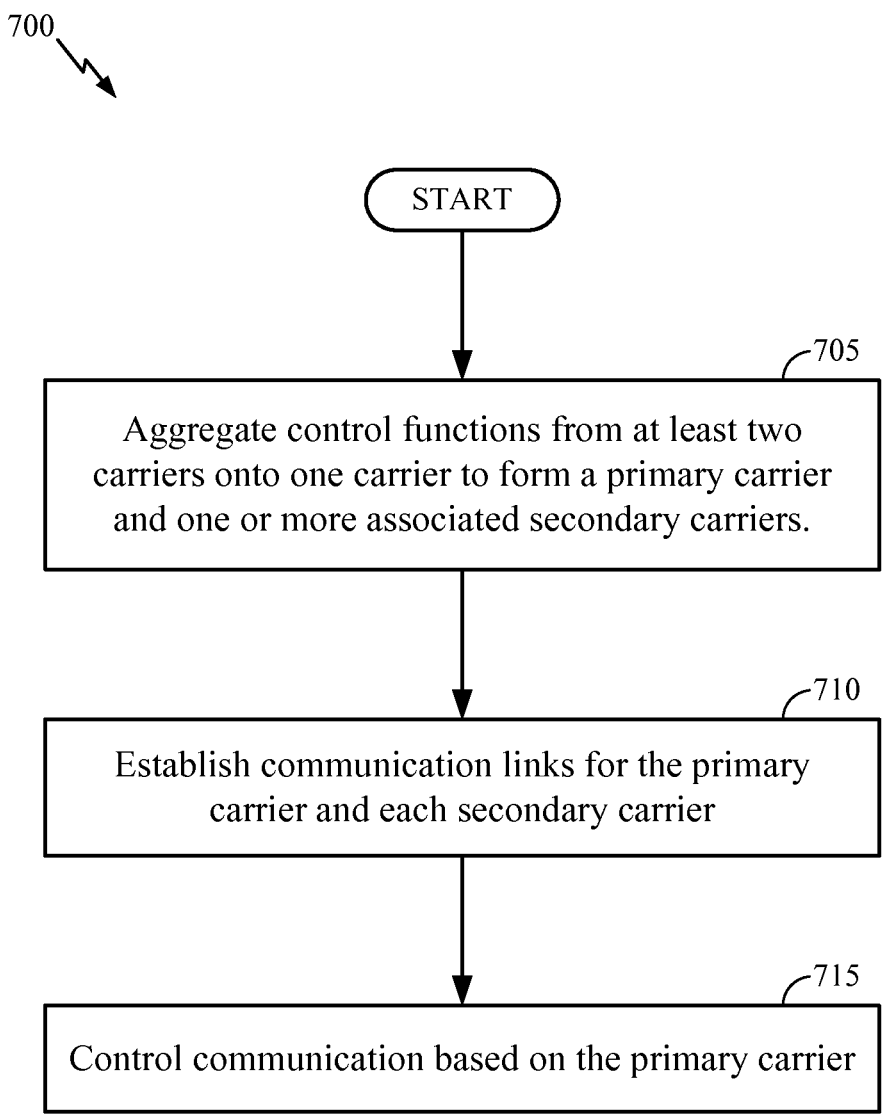
FIG. 7 illustrates example operations, in accordance with certain aspects of the disclosure.

FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. For example, all of the control functions for component carriers 510a, 510b, and 510c in FIG. 5 may be aggregated on component carrier 510a, which acts as the primary carrier for the aggregation of carriers 510a, 510b, and 510c. Next at block 710, communication links are established for the primary carrier and each secondary carrier. For example, a UE (e.g., UE 116 and/or 122) associating with an eNodeB (e.g., eNodeB 102) receives configuration information regarding the component carriers 510a, 510b, and 510c (e.g., bandwidth of each component carrier), and configuration information indicating mappings between control information to be received on primary carrier 510a and associated secondary carriers 510b and 510c. Then, communication is controlled based on the primary carrier in block 715. For example, an eNodeB may transmit a PDCCH to a UE on primary carrier 510a conveying a downlink grant to the UE for a PDSCH directed to the UE and transmitted by the eNodeB on secondary carrier 510b.

Example Handling FDD and TDD Timing Offset in FDD and TDD CA in LTE

Aspects of the present disclosure provide techniques that may be used by a UE to determine timing of uplink transmissions when the UE is aggregating both TTD and FDD component carriers.

Figure 8:
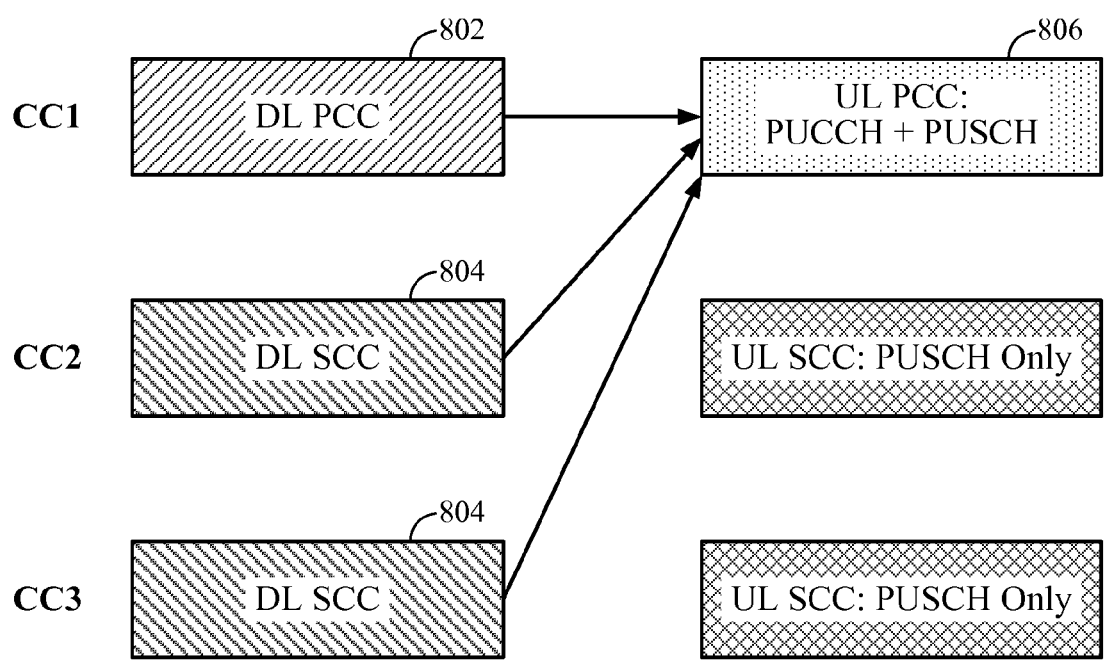
FIG. 8 illustrates an example carrier aggregation (CA) configuration, in accordance with certain aspects of the disclosure.

Certain types of devices, such as UEs operating in accordance with LTE Release 10, may be configured to communicate using multiple component carriers (CCs). For example, as seen in FIG. 8, one CC may be designated as a primary CC (PCC) (e.g., DL PCC 802), while others may be designated as secondary CCs (SCCs) (e.g., DL SCCs 804). PCCs may be semi-statically configured by higher layers on a per user equipment (UE) basis. Acknowledgement/Negative Acknowledgement (ACK)/(NAK), channel quality information (CQI) and scheduling requests (SRs), when transmitted on a physical uplink control channel (PUCCH), may be transmitted on a PCC.

In some cases, SCCs may not carry PUCCH for a UE. Additionally, in some subframe configurations, there may be more CCs used for downlink (DL) than uplink (UL). For example, up to 5-to-1 DL to uplink UL CC mapping is possible. As a result, one UL CC (e.g., UL PCC 806) may support ACK/NAK transmission on PUCCH for up to five DL CCs.

Certain standards (e.g., LTE Release 11), have introduced the concept of multiple timing adjustment groups (TAGs) to support cases where different uplink bands require different timing advances. For example, different timing advances may be required due to the use of repeaters (i.e., devices that function to receive and rebroadcast a signal from a base station) in one of the band or differences in the internal delays of the band specific repeaters. A TAG may be defined as a group of serving cells that is configured by a radio resource control RRC message and that, for the cells with an UL configured, use the same timing reference cell and the same Timing Advance value. One such timing adjustment group may be known as a Primary Timing Advance Group (pTAG), which may contain the primary cell (PCell). Another timing adjustment group may be known as a Secondary Timing Advance Group (sTAG), which may not contain the PCell.

In some cases, however, a maximum time difference among aggregated TDD and FDD CCs may exceed the amount of adjustment provided by a timing advance value for a TAG. Aspects of the present disclosure, however, provide techniques that a UE may use to adjust timing of uplink transmissions when a UE communicates using aggregated TDD and FDD CCs.

Figure 9:
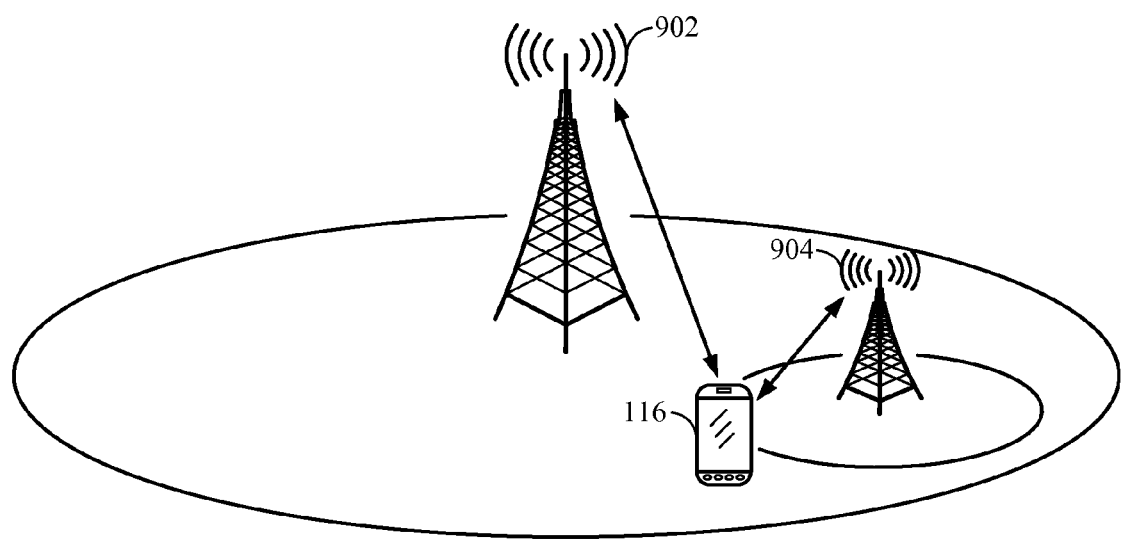
FIG. 9 illustrates a wireless communication system capable of dual-connectivity, in accordance with certain aspects of the present disclosure.

An example scenario in which timing differences exist between aggregated CCs is a UE in dual-connectivity mode, as illustrated in FIG. 9. Dual-connectivity generally involves a UE 116 simultaneously connected with a macro cell 702 and a smaller cell 704 (e.g., a lower power cell, such as a pico cell).

Under dual connectivity, two or more CCs aggregated for a UE may not have ideal backhaul connectivity. As a consequence, PUCCH may be supported on an Scell. Additionally, as noted above, TDD and FDD carrier aggregation may be supported. Under TDD and FDD carrier aggregation, the UE may determine the start transmission time of an uplink radio frame based on an equation:

$$(N_{TA}+N_{TAoffset}) \times Ts \text{ seconds}$$

before the start of the corresponding downlink radio frame, where $N_{TA}$ is the timing advance based on TA commands from eNB, Ts equals $1/(15000 \times 2048)$ seconds, and $N_{TAoffset}$ is 0 for FDD and 624 for TDD. Thus, in TDD, there may be an extra offset of roughly 20 μs (i.e., $1/(15000 \times 2048) \times 624 = \sim 20$ μs) in the uplink timing advance, which may be used as a switching gap for the UL-DL switching. Thus, in TDD-FDD CA, even with a single timing advance group, the uplink transmissions on the TDD carrier may become 20 μs is more advanced compared to the FDD uplink carrier. Accordingly, there is a need in how to handle different TA offsets defined for TDD and FDD in LTE TDD/FDD CA.

There are different approaches available to address this (20 μs) timing offset. For example, it may be possible to extend the maximum supported timing difference between different TAGs to 50 μs. However, a new max UL timing difference may require changes in infrastructure, requiring additional specification work across multiple working groups.

Another potential approach to address the 20 μs is timing offset is to rely on an existing multi-TA framework (with multiple timing adjustment values applied by the UE). In this case, the UE may be configured with different timing adjust groups (TAGs) for the TDD and FDD serving cells, which may support a timing difference up to approximately 30 μs. However, configuring a UE with different TAGs for the TDD and FDD serving cells may reduce the maximum supported timing propagation delay difference to roughly 10 μs, corresponding to 3 km difference in propagation distance. Additionally, having multiple TA groups may increase UL operation complexity and the overhead involved in managing multiple TAGs.

Another potential approach to address the 20 μs timing offset is to align the FDD cell reception timing with the TDD cell reception timing. In this case the TA for all UEs (including legacy UEs) within the FDD cell may be biased by approximately 20 μs. The existing multi-TA framework may be used to set different FDD and TDD TA values for TDD-FDD CA UEs. This approach may allow the maximum supported propagation delay difference between the TAGs to be kept as 30 μs. However, having multiple TA groups may increase UL operation complexity and the overhead involved in managing multiple TA group.

Another potential approach to address the 20 μs timing offset is to align reception timing with the TDD cell timing by enabling configuration of CA specific TA values by the UE when configured with TDD-FDD CA. Under this example, a single TA value may be used and the Pcell may remain as the timing reference. Under this example, UEs communicating using TDD and FDD CA may not need to be configured with multiple TAGs, which may avoid the slight overhead from managing multiple timing advance values. Still, for so-called legacy UEs (that do not support FDD and TDD CA) on the FDD serving cell the timing advance may need to be biased by approximately 20 μs in order to keep the timing for all UEs in the cell aligned.

A challenge exists when a UE transitions between a case without any TDD CCs, and a case with TDD CCs as secondary cells, which may require the UE to adjust UL timing.

Figure 10:
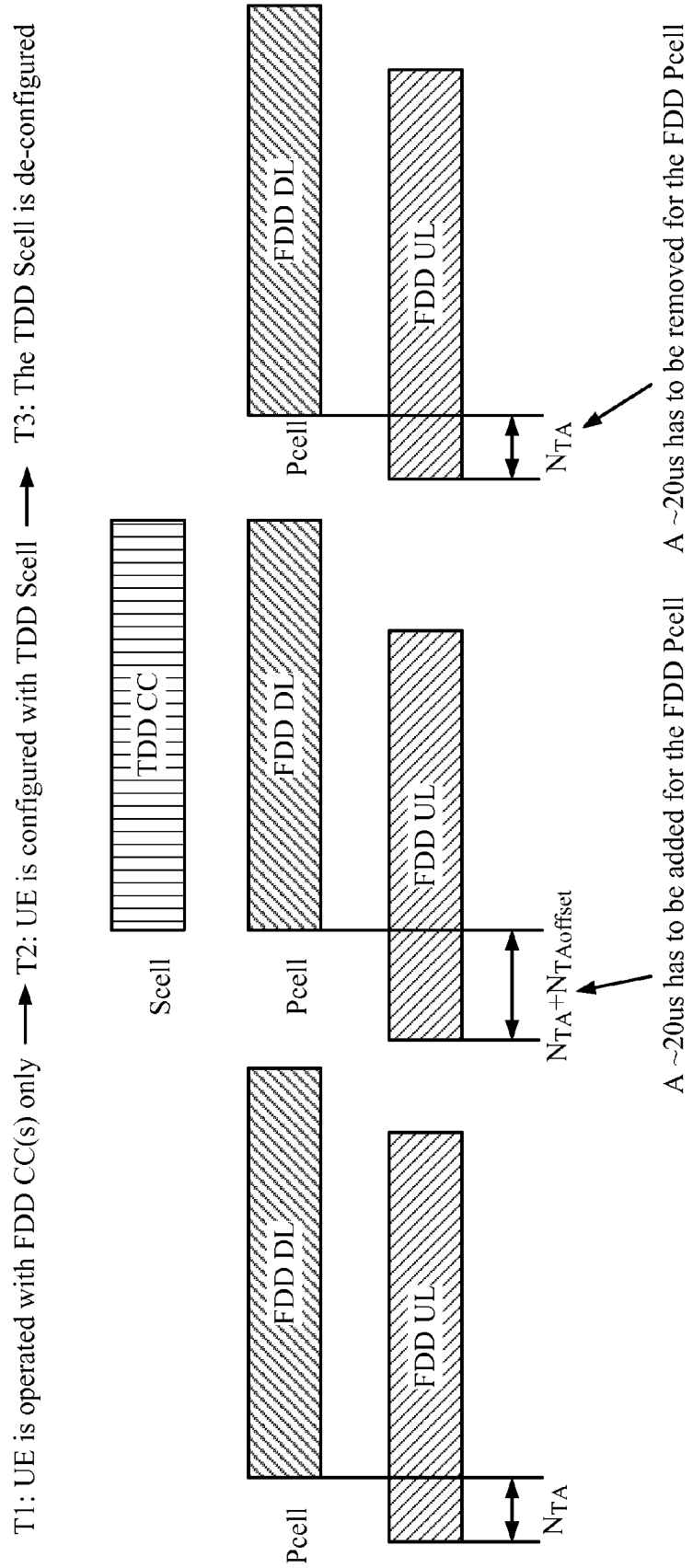
FIG. 10 examples of timing adjustment (TA) offset scenarios, in accordance with certain aspects of the disclosure.

For example, as illustrated in FIG. 10, the UE may need to adjust the UL timing offset for the FDD Pcell when a TDD CC is added and/or removed. As illustrated, at time T1 $N_{TAoffset}$ is zero (meaning that the TA only comprises $N_{TA}$) since only FDD CCs are being used. However, at time T2 because a TDD carrier is added and because, under this example, the reception timing is aligned with the TDD cell timing, the TA includes both $N_{TA}$ and $N_{TAoffset}$=624.

In other words, because the reception timing is aligned with the TDD cell, an additional 20 μs is added to the TA. Moreover, at T3 the 20 μs previously added in T2 needs to be removed since the TDD CC is removed. Thus, under this example, at T3 the eNB may need to issue a TA command to adjust for the autonomous TA adjustment to align UL reception timing of the UE with other UEs on the same FDD CC, wasting resources.

Aspects of the present disclosure, provide techniques that may be applied to address the timing offset, while avoiding some of the drawbacks of the approaches discussed above. The techniques allow a UE to select a TA offset value to use, for example, based on whether a primary CC is FDD or TDD.

Figure 11:
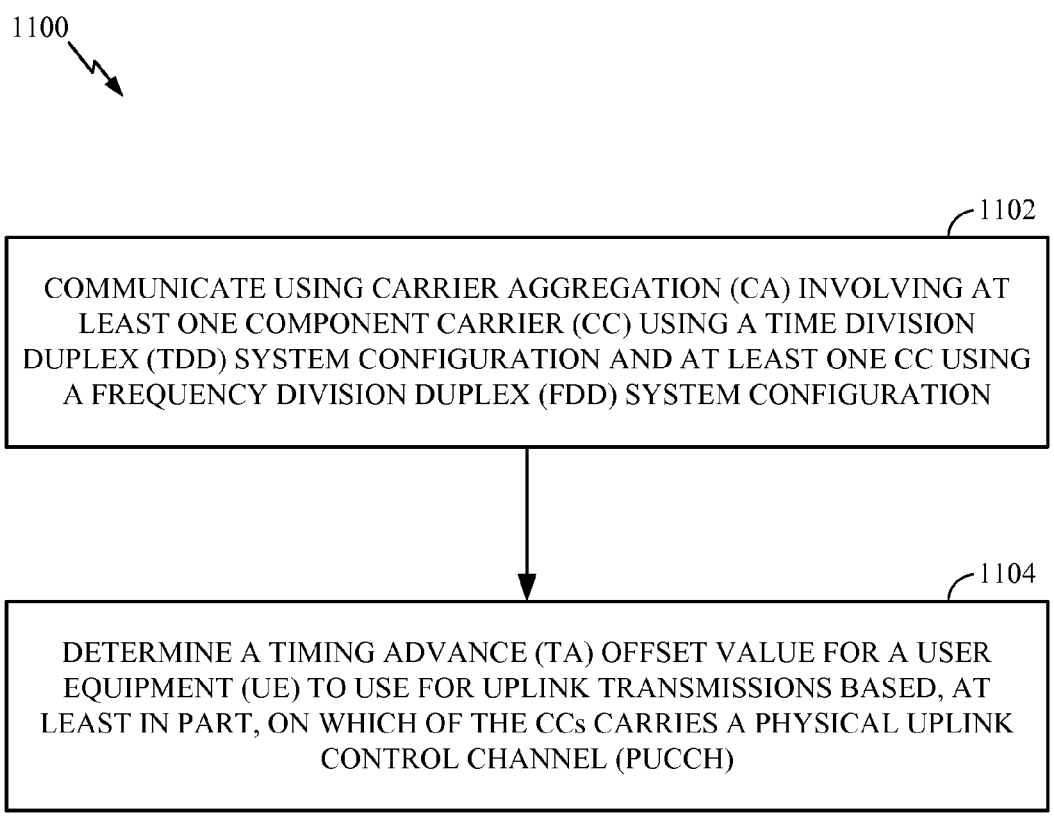
FIG. 11 illustrates example operations 1100 for wireless communications, in accordance with aspects of the present disclosure.

For example, FIG. 11 illustrates example operations 1100 for handling different TA offsets defined for TDD and FDD in LTE TDD/FDD CA, in accordance with aspects of the present disclosure. The operations 1100 may be performed, for example, by a base station (e.g., eNB 110) or a user equipment (UE) (e.g., UEs 116 and/or 122) capable of communicating using CA.

The operations 1100 begin, at 1102, by communicating using carrier aggregation (CA) involving at least one component carrier (CC) using a time division duplex (TDD) system configuration and at least one CC using a frequency division duplex (FDD) system configuration. Operations continue, at 1104, by determining a timing advance (TA) offset value for a user equipment (UE) to use for uplink transmissions based, at least in part, on which of the CCs carries a physical uplink control channel (PUCCH).

Thus, according to operations 1100, a UE may resolve the issue of having different TA offsets for TDD and FDD in LTE TDD/FDD CA by basing the UL timing offset, $N_{TA\ offset}$, for a UE in FDD/TDD CA on the Pcell system type. For example, according to certain aspects, if Pcell is FDD, $N_{TA\ offset}$=0 for all CCs in CA for the UE. If Pcell is TDD, $N_{TA\ offset}$=624 for all CCs in CA for the UE. In this case, there may be no need to update UL timing when a TDD Scell is added or removed.

Figure 12:
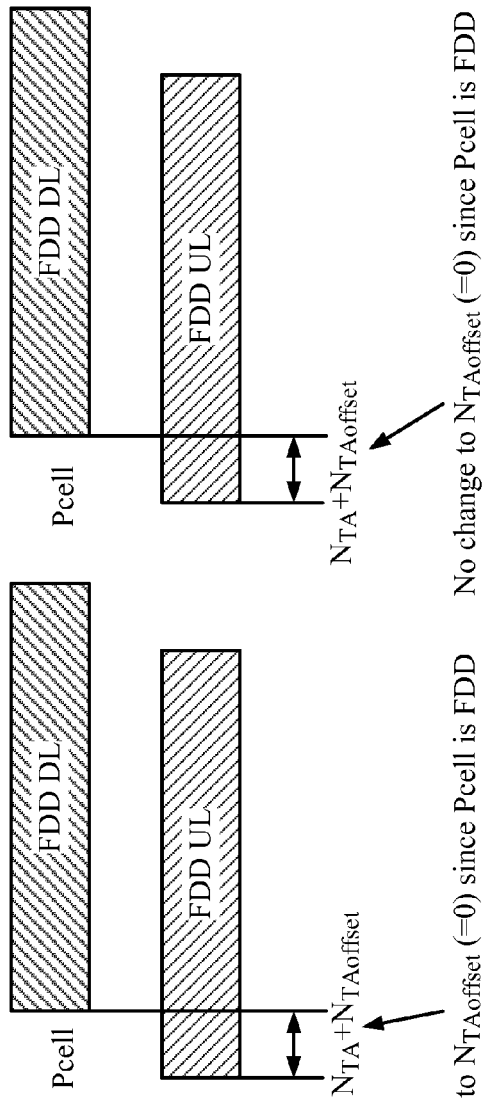
FIG. 12 illustrates examples of timing adjustment (TA) offset scenarios, in accordance with certain aspects of the disclosure.

FIG. 12 illustrates an example, according to aspects of the present disclosure, where a UE bases UL timing on the Pcell system type. In the illustrated example, the Pcell system type is FDD. Thus, the TA offset value ($N_{TAoffset}$) for FDD (which is zero) is used, since the UL timing is based on the FDD Pcell. At time T1, the UE communicates with only FDD CCs and the $N_{TAoffset}$ is zero. At time T2, even though the UE is now configured with a TDD Scell, the UL timing remains the same (i.e., $N_{TAoffset}$ remains zero) since the UL timing is based on the FDD Pcell, not on the TDD CC. At time T3, when the TDD CC is de-configured, the UE still bases UL timing on the TA offset value used for FDD.

Figure 13:
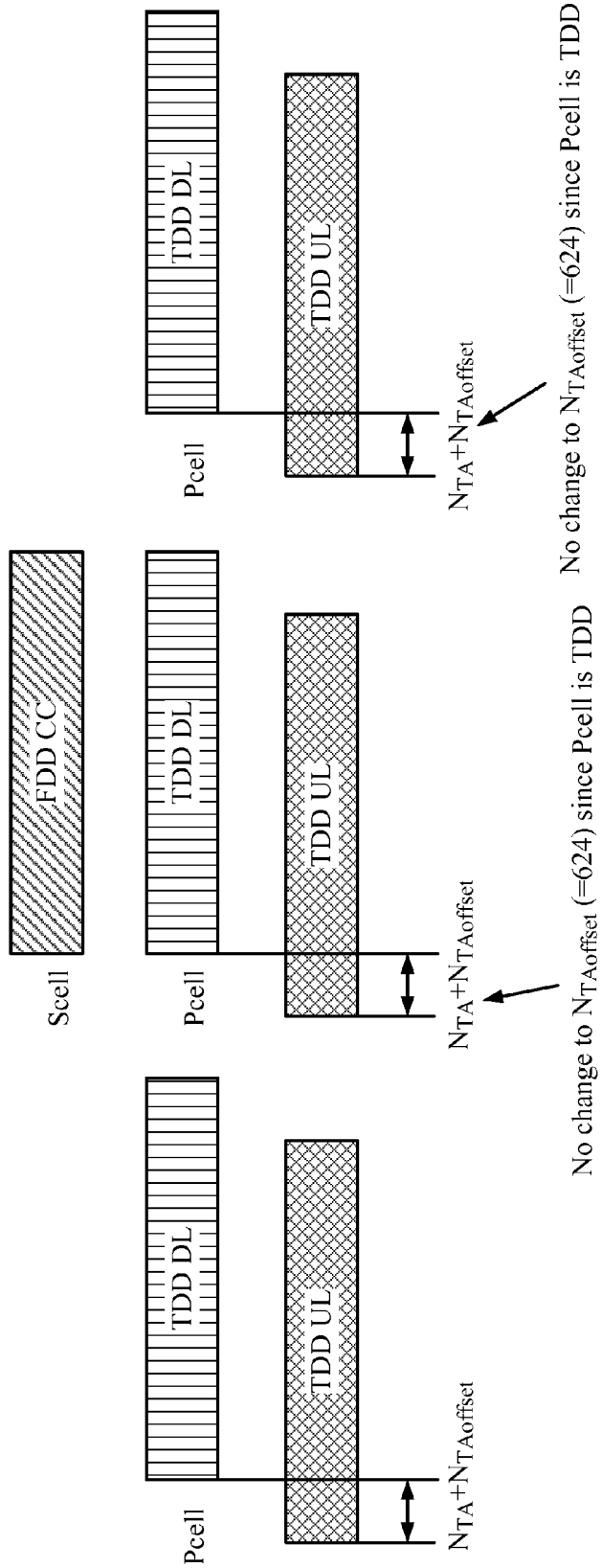
FIG. 13 illustrates examples of timing adjustment (TA) offset scenarios, in accordance with certain aspects of the disclosure.

FIG. 13 illustrates a similar scenario as FIG. 12, but where a UE bases UL timing on a TDD Pcell. In this example, at time T1, the UE may be operated with TDD CCs only and, hence, the $N_{TAoffest}$ value for TDD (624) is used since the UL timing is based on the TDD Pcell. At time T2, the UE may be configured with an FDD Scell CC, but the UL timing remains the same (i.e., $N_{TAoffset}$ remains 624) since the UL timing is based on the TDD Pcell, not on the FDD CC. At time T3, when the FDD CC is de-configured, the TA offset value used for UL timing remains the same (i.e., $N_{TAoffset}$ remains 624) since the UL timing is based on the FDD Pcell.

According to certain aspects, the timing offset value may be determined based on the Pcell system type regardless of whether a Scell and the Pcell are of a same TAG or not.

According to certain aspects, the determination may depend on whether an Scell and the Pcell are in a same TAG or not. For example, if an Scell and the Pcell are in a same TAG, the timing offset for the Scell may be determined based on the Pcell system type (e.g., FDD or TDD). However, if the Scell and the Pcell belong to two different TAGs, the timing offset for the Scell of an sTAG may be determined based on an Scell which carries the PRACH for the sTAG.

According to certain aspects, the timing offset for the Scell of a sTAG may be determined based on an RRC configuration. For example, the timing offset for the sTAG may be determined based on an Scell with a lowest serving cell ID configured by RRC for the UE. As an additional example, the timing offset for the sTAG may be explicitly indicated to the UE.

According to certain aspects, if PUCCH is supported on both the Pcell and a secondary cell (PUCCH Scell), and if the PUCCH cell (Pcell or PUCCH Scell) is FDD, then $N_{TA\ offset}$ may equal 0 for all CCs associated with the PUCCH cell. Additionally, if PUCCH is supported on both the Pcell and a secondary cell (PUCCH Scell), and if the PUCCH cell (Pcell or PUCCH Scell) is TDD, the TDD $N_{TAoffset}$ of 624 may be used for all CCs associated with the PUCCH cell. As used herein, a CC may generally be considered "associated" with a cell (Pcell or Scell) if that CC is used for uplink and/or downlink communications in that cell.

According to certain aspects, determining the timing offset based on the PUCCH cell system type may be applied regardless of whether a Scell is of a same TAG with one of the PUCCH cells or not. In other cases, the timing offset determination may depend on whether an Scell is of a same TAG with one of the PUCCH cells or not. For example, if the Scell is of a same TAG with one of the PUCCH cells, the timing offset for the Scell may be determined based on the PUCCH cell system type (FDD or TDD). However, if the Scell is not of a same TAG with any of the PUCCH cells, the timing offset for the Scell of a sTAG may be determined based on an Scell which carries the PRACH for the sTAG.

According to certain aspects, the timing offset for the Scell of a sTAG may be determined based on an RRC configuration. For example, the timing offset for the sTAG may be determined based on an Scell with a lowest serving cell ID configured by RRC for the UE. As an additional example, the timing offset for the sTAG may be explicitly indicated to the UE.

According to certain aspects, timing for certain CCs may be based on a type of their corresponding PUCCH cell (e.g., a cell that is used to transmit PUCCH acknowledging DL transmissions on those CCs).

Figure 14:
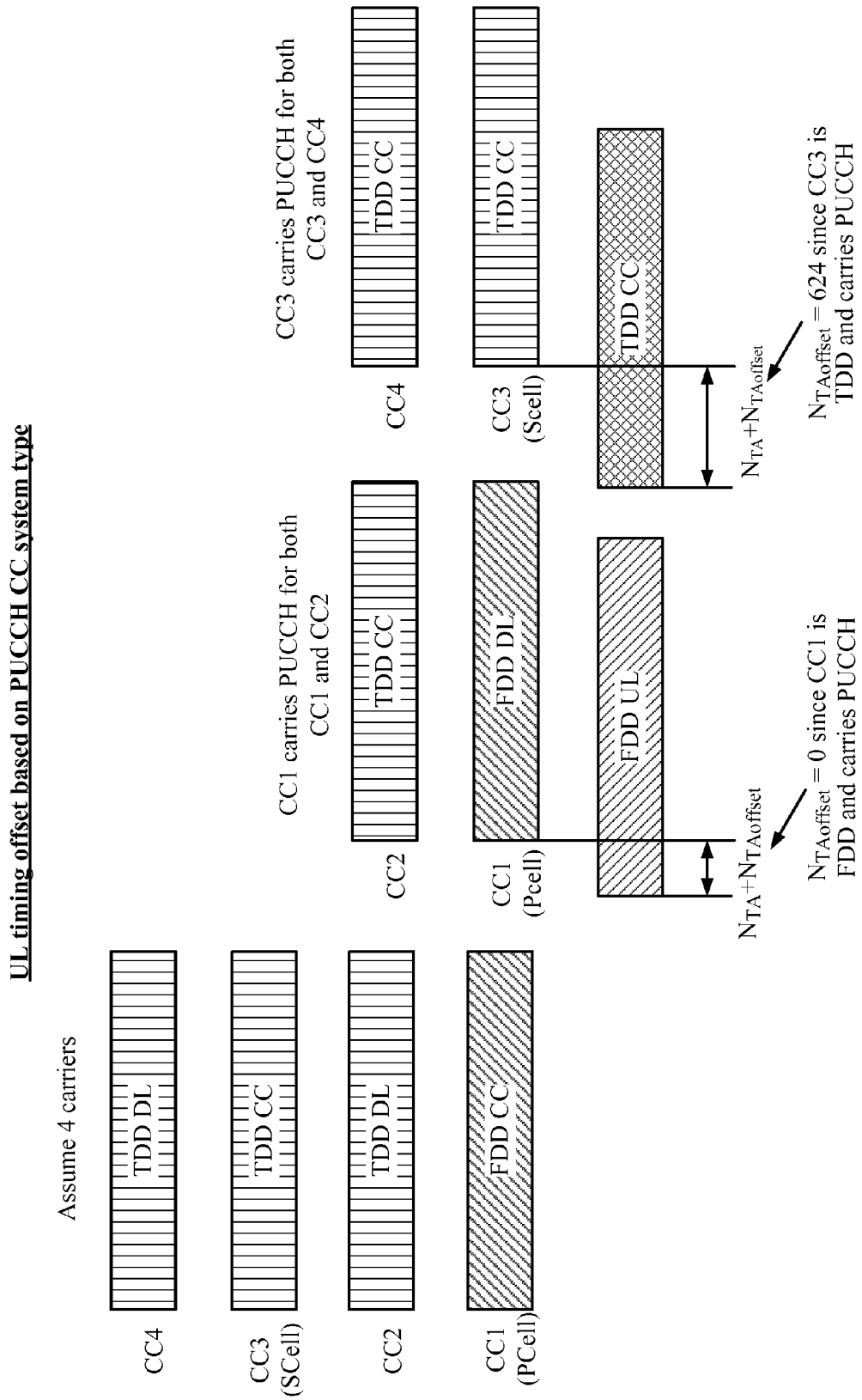
FIG. 14 illustrates examples of timing adjustment (TA) offset scenarios, in accordance with certain aspects of the disclosure.

FIG. 14 illustrates an example of how UL timing for all CCs is based on their associated PUCCH cell. The example in FIG. 14 assumes a UE with carrier aggregation using four CCs: CC1 (FDD), CC2 (TDD), CC3 (TDD), and CC4 (TDD). As illustrated, FDD CC1 may be the primary cell, which may carry PUCCH for both CC1 and CC2. Additionally, TDD CC3 may be an Scell, which may carry PUCCH for both CC3 and CC4. It should be noted that the UL/DL subframes of CC3 may follow some type of TDD UL/DL subframe configuration in which subframes in DL (or UL) may not necessarily be contiguous.

As illustrated in the middle diagram of FIG. 14, the $N_{TAoffset}$ for the primary cell is 0 since CC1 is FDD and carries the PUCCH for both CC1 and CC2. On the other hand, as illustrated in the diagram on the right side of FIG. 14, $N_{TAoffset}$ for the SCell is 624 since CC3 is TDD and carries the PUCCH for both CC3 and CC4.

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
   communicating using carrier aggregation (CA) involving at least two component carriers (CCs), wherein the at least two CCs include at least one time division duplex CC (TDD CC) using a time division duplex (TDD) system configuration and at least one frequency division duplex CC (FDD CC) using a frequency division duplex (FDD) system configuration; and
   determining a timing advance (TA) offset value for a user equipment (UE) to use for uplink transmissions on the at least two CCs based, at least in part, on whether the TDD CC or the FDD CC carries a physical uplink control channel (PUCCH).

2. The method of claim 1, wherein the TA offset value comprises a same TA offset value for all CCs used to communicate in a primary cell (Pcell) or secondary cell (Scell) carrying PUCCH.

3. The method of claim 1, wherein:
   at least one CC of the at least two CCs used to communicate in a primary cell (Pcell) carries PUCCH; and
   determining the TA offset value comprises determining the TA offset value based on a system type of the at least one CC used to communicate in the Pcell.

4. The method of claim 3, wherein:
   the TA offset value is determined to be a zero value if the system type of the at least one CC used to communicate in the Pcell is FDD; or
   the TA offset value is determined to be a positive value to accommodate a switching gap for switching between uplink and downlink subframes if the system type of the at least one CC used to communicate in the Pcell is TDD.

5. The method of claim 1, wherein at least one CC of the at least two CCs used to communicate in a primary cell (Pcell) and at least one CC of the at least two CCs used to communicate in a secondary cell (Scell) carries PUCCH.

6. The method of claim 5, wherein the determining comprises determining the TA offset value based on a system type of the at least one CC used to communicate in the Pcell.

7. The method of claim 5, wherein:
   at least one CC used to communicate in the Pcell carries PUCCH;
   at least one CC used to communicate in the Scell also carries PUCCH;
   a first TA offset value is used for CCs used to communicate in the Pcell; and
   a second TA offset value is used for CCs used to communicate in the Scell.

8. The method of claim 1, wherein the at least one FDD CC and the at least one TDD CC are of a same timing advance group.

9. The method of claim 1, wherein a different TA offset value is used when the TDD CC carries the PUCCH as compared to when the FDD CC carries the PUCCH.

10. An apparatus for wireless communications, comprising:
at least one processor configured to:
communicate using carrier aggregation (CA) involving at least two component carriers (CCs), wherein the at least two CCs include at least one time division duplex component carrier (TDD CC) using a time division duplex (TDD) system configuration and at least one frequency division duplex CC (FDD CC) using a frequency division duplex (FDD) system configuration, and
determine a timing advance (TA) offset value for a user equipment (UE) to use for uplink transmissions on the at least two CCs based, at least in part, on whether the TDD CC or the FDD CC carries a physical uplink control channel (PUCCH); and
a memory coupled with the at least one processor.

11. The apparatus of claim 10, wherein the TA offset value comprises a same TA offset value for all CCs used to communicate in a primary cell (Pcell) or secondary cell (Scell) carrying PUCCH.

12. The apparatus of claim 10, wherein:
at least one CC of the at least two CCs used to communicate in a primary cell (Pcell) carries PUCCH; and
the at least one processor configured to determine the TA offset value determines the TA offset value based on a system type of the at least one CC used to communicate in Pcell.

13. The apparatus of claim 12, wherein:
the TA offset value is determined to be a zero value if the system type of the at least one CC used to communicate in the Pcell is FDD; or
the TA offset value is determined to be a positive value to accommodate a switching gap for switching between uplink and downlink subframes if the system type of the at least one CC used to communicate in the Pcell is TDD.

14. The apparatus of claim 10, wherein at least one CC of the at least two CCs used to communicate in a primary cell (Pcell) and at least one CC of the at least two CCs used to communicate in a secondary cell (Scell) carries PUCCH.

15. The apparatus of claim 14, wherein the at least one processor is configured to determine the TA offset value based on a system type of the at least one CC used to communicate in the Pcell.

16. The apparatus of claim 14, wherein:
at least one CC used to communicate in the Pcell carries PUCCH;
at least one CC used to communicate in the Scell also carries PUCCH;
a first TA offset value is used for CCs used to communicate in the Pcell; and
a second TA offset value is used for CCs used to communicate in the Scell.

17. The apparatus of claim 10, wherein the at least one FDD CC and the at least one TDD CC are of a same timing advance group.

18. An apparatus for wireless communications, comprising:
means for communicating using carrier aggregation (CA) involving at least two component carriers (CCs), wherein the at least two CCs include at least one time division duplex CC (TDD CC) using a time division duplex (TDD) system configuration and at least one frequency division duplex CC (FDD CC) using a frequency division duplex (FDD) system configuration; and
means for determining a timing advance (TA) offset value for a user equipment (UE) to use for uplink transmissions on the at least two CCs based, at least in part, on whether the TDD CC or the FDD CC carries a physical uplink control channel (PUCCH).

19. The apparatus of claim 18, wherein the TA offset value comprises a same TA offset value for all CCs used to communicate in a primary cell (Pcell) or secondary cell (Scell) carrying PUCCH.

20. The apparatus of claim 18, wherein:
at least one CC of the at least two CCs used to communicate in a primary cell (Pcell) carries PUCCH; and
the means for determining are configured to determine the TA offset value based on a system type of the at least one CC used to communicate in the Pcell.

21. The apparatus of claim 20, wherein:
the TA offset value is determined to be a zero value if the system type of the at least one CC used to communicate in the Pcell is FDD; or
the TA offset value is determined to be a positive value to accommodate a switching gap for switching between uplink and downlink subframes if the system type of the at least one CC used to communicate in the Pcell is TDD.

22. The apparatus of claim 18, wherein at least one CC of the at least two CCs used to communicate in a primary cell (Pcell) and at least one CC of the at least two CCs used to communicate in a secondary cell (Scell) carries PUCCH.

23. The apparatus of claim 22, wherein the means for determining comprises means for determining the TA offset value based on a system type of the at least one CC used to communicate in the Pcell.

24. The apparatus of claim 22, wherein:
at least one CC used to communicate in the Pcell carries PUCCH;
at least one CC used to communicate in the Scell also carries PUCCH;
a first TA offset value is used for CCs used to communicate in the Pcell; and
a second TA offset value is used for CCs used to communicate in the Scell.

25. The apparatus of claim 18, wherein the at least one FDD CC and the at least one TDD CC are of a same timing advance group.

26. A non-transitory computer-readable medium having instructions stored thereon that, when executed by a computer, cause the computer to:
communicate using carrier aggregation (CA) involving at least two component carriers (CCs), wherein the at least two CCs include at least one time division duplex CC (TDD CC) using a time division duplex (TDD) system configuration and at least one frequency division duplex CC (FDD CC) using a frequency division duplex (FDD) system configuration; and
determine a timing advance (TA) offset value for a user equipment (UE) to use for uplink transmissions on the at least two CCs based, at least in part, on whether the TDD CC or the FDD CC carries a physical uplink control channel (PUCCH).

* * * * *